Patented Jan. 3, 1939

2,142,145

UNITED STATES PATENT OFFICE 2,142,145

PLASTICS AND PROCESS OF PRODUCING THE SAME

Joseph C. Patrick, Morrisville, Pa., assignor to Thiokol Corporation, Yardville, N. J., a corporation of Delaware No Drawing. Application October 6, 1937, Serial No. 167,669

21 Claims. (Cl. 260—79)

This invention relates to the production of plastic or rubber-like bodies, having certain valuable and unique properties, and is a continuation in part of my co-pending application Ser. No. 17,789, filed April 23, 1935.

The principles of the invention will be illustrated by the following specific and typical examples. It is intended and will be understood that the invention is illustrated by, but not limited to, said specific examples. The object of the examples is to provide guide posts or markers to indicate the scope of the invention which will be defined by the claims ultimately appended hereto:

Example 1.—138 lbs. or 1 mol of dimercapto ethyl ether, $SH.C_2H_4.O.C_2H_4.SH$, are dissolved in 100 gallons sodium hydroxide solution containing 90 lbs. of NaOH; that is, an amount of NaOH slightly in excess of 2 mols. With this solution there is intimately mixed a freshly prepared suspension of magnesium hydroxide made by treating 10 pounds of $MgCl_2.6H_2O$ with 2 gallons of water and adding thereto a solution of 4 lbs. NaOH dissolved in 0.5 gallon of water. The entire mixture is then placed in a reaction vessel provided with stirring means and also means for heating, for example, steam coils. The mixture is subjected to stirring and to this is gradually added an oxidizing agent in the form of a solution of sodium polysulfide (made, for example, by dissolving 348 lbs. or 2 mols of sodium tetrasulfide in 100 gallons of water) during a period of about ten minutes. The reaction occurs approximately at room temperature and is somewhat exothermic. The reaction is substantially completed after all the polysulfide has been added. The completion of the reaction is indicated by withdrawing a sample, acidifying it and observing whether the odor of mercaptan is absent. Stirring may be continued until the reaction is completed as indicated by this test.

The polysulfide acts as an oxidizing agent and converts the dimercapto ethyl ether into a complex polymer or plastic. The advantage of the magnesium hydroxide is that the said polymer or plastic is produced in the form of a latex-like liquid which has the unique property of being capable of intimate mixture with water and settling out subsequently by the action of gravity. This property permits intimate and thorough washing to remove soluble impurities. Acidification of the latex-like liquid causes the separation of polymer as an agglomerated mass, the removal of the impurities from which would be a difficult problem. It is therefore highly desirable to accomplish the washing while this mass is in dispersed form, inasmuch as under such conditions the high degree of dispersion of the polymer permits an extremely thorough removal of the soluble impurities by washing. The difficulty of transporting the latex in agglomerated form, and the ease with which it sticks to parts of apparatus, such as the stirrer, also makes it advisable to produce the polymer in the reaction vessel in its dispersed latex-like form, from which vessel it can be readily removed because of its fluid characteristics. If the polymer were produced in the reaction vessel in its coagulated rubbery form it would be difficult to remove it therefrom and it would be contaminated with the reagents used in its manufacture.

Washing of the polymer in its dispersed condition may be accomplished in the reaction vessel by stirring it up with successive quantities of water, settling and drawing off the supernatant wash liquid. The washing can, of course, be accomplished in a different vessel. In any event, it is desirable to preserve the polymer in its dispersed condition until after removal from the reaction vessel.

The washed latex is then transferred to a second vessel where coagulation or agglomeration is produced by acidification. Sufficient acid may be added for this purpose until the mother liquid is acid to methyl orange or brought to a pH of about 3. The coagulated polymer is then dehydrated by any suitable method, e. g., milling, mastication, or kneading. In such processes, considerable heat is generated which, together with the mechanical action, causes the removal of water.

In the above example, instead of sodium hydroxide as the agent for dissolving the dimercapto compound, other alkaline hydroxides could be used, for example, potassium, ammonium, lithium, calcium, barium, strontium, and in general any other alkaline materials which will not form highly insoluble sulfides.

Instead of magnesium hydroxide, other gelatinous hydroxides may be employed, for example, aluminum hydroxide, chromium hydroxide, ferric hydroxide. Moreover, dispersing agents other than hydroxides may be employed, for example, gelatin, albumin, casein, agar, soluble cellulose esters, etc.

Instead of sodium polysulfide, other polysulfides may be employed, e. g., potassium and ammonium polysulfide or any other soluble polysulfide. Other oxidizing agents may be used, for example, oxygen, air, ozone, hypohalites, and in general any oxidizing agent effective in an alkaline solution, for example, hydrogen peroxide, and metallic peroxides, perborates, chromates, dichromates, manganates and permanganates, etc. The reaction is preferably carried on under alkaline conditions because it has been found that the reaction is very favorably influenced by such conditions.

Although in the above example, the step of agglomerating or coagulating the polymer was specifically described, it is in some cases advantageous to preserve the polymer in its dispersed form as such, e. g., for use in coating and impregnating various materials.

The product obtained in this case is a white coagulum which, upon drying, is, in thin sheets, a pale amber translucent and highly elastic solid. When compounded with oxidizing agents including zinc oxide, it undergoes transformation by heat. The transformed product is highly elastic and resistant to tear. It is practically unaffected by immersion in gasoline over long periods and will withstand exposure to benzene. It confers a greatly enhanced resistance to natural and synthetic rubbers such as chloroprene rubber and the polymerized butadienes, when compounded with them, followed by curing of the mixture, in proportions ranging from 10% to 70% depending upon the degree of solvent resistance required. The presence of an organic acid or substance, as for example, an organic cyanide, capable of yielding small amounts of an organic acid at curing temperatures, in the presence of traces of moisture always present, greatly assists in the cure and enhances the final properties of the cured compound.

One of the important properties of the product of this invention is its capacity to be transformed by heat into a plastic or product having valuable commercial properties.

The capacity of the polymer to be prepared in an intermediate form, amenable to many operations and uses, including removal of impurities, through drying, molding, spreading, coating, or dispersion in certain solvents to produce cements while still retaining the capacity for setting up or curing by heat to develop its ultimate properties, all contribute to the commercial value of the process and product of this invention.

This property makes it possible to produce a highly purified intermediate polymer consisting substantially completely of an organic compound free from inorganic electrolytes. While these impurities can be removed satisfactorily from said intermediate polymer their removal from the final plastic would be difficult.

Moreover, the wide variety of different products which may be made from the intermediate polymer make it possible to manufacture and sell this intermediate form in bulk to different consumers who then may produce therefrom their particular product.

When the consumer gets his raw product it must be amenable to a wide variety of operations, such as molding, etc., while retaining the capacity to change and develop its ultimate valuable properties at the will of the consumer. Moreover, this change should not be accompanied by evolution of noxious or other gases or even a substantial evolution of water.

Therefore, while the preparation of the intermediate polymer as a chemical factory operation may be accompanied by the production of various by-products (removed by washing, etc.) the transformation from intermediate to final polymer should be a reaction with as little outward manifestation as possible, except the development of valuable properties, because while the preparation of the intermediate polymer from mercaptans occurs in a chemical factory equipped with means to care for and remove undesired by-products, the transformation from intermediate to final polymer occurs frequently in places where odors, etc., would make its use impractical.

Moreover, the change wrought by the consumer must be a simple one. The production of the intermediate polymer requires a chemical reaction of the sort possible only in a chemical factory, whereas the curing or transformation caused by the consumer is simple and requires only heat, e. g., heating in a mold.

For these and other reasons the present invention provides for the preparation of an intermediate polymer, in a form capable of developing its valuable properties by a relatively simple subsequent operation, i. e., mere heating.

The following is a specific illustrative example of the curing or transformation of the intermediate polymer into its final state by heat.

*Example 2*

| | Pounds |
|---|---|
| Intermediate polymer prepared as in Example 1 | 100.00 |
| Zinc oxide | 10.00 |
| Carbon black | 60.00 |
| Stearic acid | 0.50 |
| Mercaptobenzo thiazole | 0.25 |

These ingredients are thoroughly mixed and then subjected to a temperature of 290° F. for 60 minutes or 300° F. for 30 minutes.

The properties of the cured product are as follows:

*Tensile strength.*—About 1700#/sq. in.
*Elongation at break.*—About 500%.
*Temperature resistance.*—Will not become inflexible above −45° F. Will stand about 200° F. continuously.
*Solvent resistance.*—Substantially unaffected by water, gasoline, paraffin hydrocarbons, dilute acids and alkalies. Very slightly affected by solvents such as benzol, toluol, xylol. Unaffected by alcohol, acetone and esters.
*Tear and abrasion resistance.*—Excellent.
*Electrical properties.*—Closely approaching those of natural rubber.
*Stability.*—Substantially unaffected by age or sunlight. Uniquely resistant to ozone, oxygen or air.
*Effect of gases.*—Highly resistant to diffusion. About 40 times less permeable than natural rubber.

The mechanism of polymer formation consists in the removal of H-atoms from mercaptan terminals by oxidation thus:

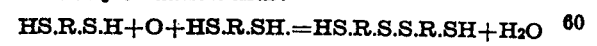

$$HS.R.S.H + O + HS.R.SH = HS.R.S.S.R.SH + H_2O$$

where oxygen or an oxygen-yielding oxidizing agent is used. The dimer thus formed again reacts with oxygen to form a tetramer. This then reacts to form an octomer and finally a long chain polymer results with mercaptan or mercaptide terminals. Thus, when the reaction is carried out in a sodium hydroxide solution the polymer has the formula

$$NaS.R.S.S.R.S.S \ldots R.S.S.R.SNa$$

In this condition the polymer remains in a highly dispersed form in alkaline solution in the presence of a dispersing agent and can be washed free of impurities, prior to coagulation. Owing to this property, the thoroughly washed dispersion or latex yields a coagulum free from water soluble impurities and electrolytes, which if allowed to remain would impair its useful properties.

Upon acidification, the dispersion is coagulated and the polymer separates as a rubber-like plastic mass. In that condition the metallic terminals are converted into hydrogen and the polymer has the formula

HS.R.S.S.R.S.S ..... R.S.S.R.SH

Owing in part at least to the remaining or residual activity of said hydrogen terminals the polymer is potentially reactive and undergoes a further change upon heating with oxidizing agents. By this change its physical properties are greatly improved. Its valuable and unique properties become developed by this further change.

In its intermediate stage the polymer may be mixed with various fillers and oxidizing agents and subsequently molded into any desired final form under heat and pressure.

In general, it has been found that this invention can be carried out as described by oxidizing compounds containing an —SH group attached to each of two different carbon atoms and a long list of reactions is herewith submitted in support of this statement.

There are certain properties common to all such compounds. First, as to the uncured polymer, it is more or less plastic and can be compounded with various materials including oxidizing agents. Upon heating with oxidizing agents, e. g., zinc oxide and other metallic and non-metallic oxides or organic oxidizing agents, e. g., benzoyl peroxide and polynitro-aromatic compounds, a curing reaction takes place exemplified in Example 2. The uncured polymer has the ability to combine with sulfur at moderate temperatures, e. g., 100 to 150° F. and to yield a reaction product from which said sulfur is given off in nascent condition at higher temperatures, especially in the presence of a substance which will combine with said sulfur such as natural and synthetic rubbers, unsaturated glycerides and fatty acids, etc. The potentially reactive or intermediate polymer of this invention is a long chain compound having organic radicals linked together by a disulfide group —S.S— thus

HS.R.S.S.R.S.S.R.SS ..... R.SS.R.SH with SH radicals at the terminals. This is a disulfide polymer and reacts with sulfur to form a tetrasulfide polymer thus $$HS.R.SS \ldots\ldots R.SH + 2S = HS.R.S.S \underset{S\ S}{\overset{\|\ \|}{\ }} \ldots\ldots R.SH$$

The added sulfur is in a labile condition.

The tetrasulfide having this labile sulfur available is an excellent vulcanizing agent for natural and synthetic rubbers, the vulcanized product being free from sulfur bloom and this is especially valuable in the case of butadiene polymers which bloom rather badly when vulcanized with free sulfur.

Secondly, as to the common properties of the cured polymers. They are all characterized by toughness and more or less elasticity, unique resistance to solvents for rubber, unique stability against oxygen, air, sunlight and water.

However, the properties of the atomic structure to which is joined the carbon atoms connected to said —SH groups influences the properties of the polymer produced by oxidation and certain classes of said structure have been found to confer remarkable properties on said polymer.

One of these classes is that characterized by saturated straight chain carbon atoms for example:

$HS(CH_2)_2SH$ ---------------- Dimercapto ethane.
$HS(CH_2)_3SH$ ---------------- Dimercapto propane.
$HS(CH_2)_5SH$ ---------------- Dimercapto pentane.
$HS(CH_2)_{10}SH$ ------------- Dimercapto decane.

Another class is that characterized by unsaturated carbon atoms. For example:

$HS.CH_2CH=CH.CH_2.SH$ ---------- 1,4 dimercapto butene 2,3.

Another class is that characterized by ether linkages, or thio-ether linkages. For example:

$HS.C_2H_4OC_2H_4.SH$ ---------- $\beta,\beta'$ dimercapto ethyl ether.
$HS.C_3H_6OC_3H_6.SH$ ---------- $\gamma,\gamma'$ dimercapto propyl ether.
$(HS.C_3H_6O)_2CH_2$ ---------- $\gamma,\gamma'$ dimercapto dipropyl formal.
$(HS.C_2H_4O)_2CH_2$ ---------- $\beta,\beta'$ dimercapto diethyl formal.
$(HS.C_3H_6)_2S$ ---------- $\gamma,\gamma'$ dimercapto dipropyl sulfide.
$(HS.C_3H_6O)_2C:O$ ---------- $\gamma,\gamma'$ dimercapto dipropyl carbonate.
$(HS.CH_2O)_2C_2H_4$ -------- 1,2 dimercaptomethoxy ethane.

$$HS.CH_2O.CH_2.\underset{\underset{CH_3}{|}}{\overset{\overset{CH_3}{|}}{C}}.CH_2O.CH_2.SH$$ ---- 2,2 dimethyl-1,3 di (mercapto methoxy) propane.

Another class is that characterized by aryl groups. For example:

$HS.CH_2C_6H_4.CH_2SH$ ---------- p,p' dimercapto xylene.
$HS.C_2H_4.O.C_6H_4.OC_2H_4SH$ -------- $\beta,\beta'$ dimercapto diethoxy benzene.

It will be noted that the latter compound is also characterized by ether linkages.

A. Where the carbon atoms to which the —SH groups are attached are joined to and separated by straight-chain saturated carbon atoms (methylene and polymethylene groups).

Examples 3 to 6 below set forth certain specific polymers produced by oxidizing members of the class mentioned.

*Example 3.*—1 mol. of any of the following products is treated as in Example 1.

(a) $SH.(CH_2)_2SH$    94 pounds.
(b) $SH.(CH_2)_3SH$    108 pounds.
(c) $SH.(CH_2)_4SH$    122 pounds.
(d) $SH.(CH_2)_5SH$    136 pounds.
(e) $SH.(CH_2)_6SH$    150 pounds.
(f) $SH.(CH_2)_{10}SH$    206 pounds.
(g) $SH.(CH_2)_{20}SH$    346 pounds.

These polymers show a decreasing degree of flexibility as the length of the carbon chain decreases.

For example: a to c are moldable powders, d to f inclusive are definitely elastic solids, and g is a tough leathery polymer.

*Example 4.*—2,3 dimercapto butane $$CH_3.\underset{\underset{SH}{|}}{CH}.\underset{\underset{SH}{|}}{CH}.CH_3$$

122 pounds are treated as in Example 1.

*Example 5.*—2,3 dimercapto propane $$CH_3.CH.CH_3$$
$$\phantom{CH_3.}|\phantom{CH.}|$$
$$\phantom{CH_3.}SH\ SH$$

108 pounds are treated as in Example 1.

This polymer is characterized by a somewhat penetrating odor, but when compounded with sulfur and heated for several hours, it gives an elastic mass substantially odorless.

*Example 6.*—3,5 dimercapto heptane $$CH_3.CH_2.CH.CH_2-CH.CH_2.CH_3$$
$$\phantom{CH_3.CH_2.}|\phantom{CH.CH_2-C}|$$
$$\phantom{CH_3.CH_2.}SH\phantom{CH_2-CH.C}SH$$

164 pounds are treated as in Example 1.

It gave a soft elastic polymer substantially odorless both before and after cure.

All of the above polymers are intermediate products produced as in Example 1 and were then compounded and cured by heating as in Example 2. The properties mentioned below refer to the properties after curing.

The products of Examples 3(*a*), 3(*b*) and 3(*c*) are characterized by extreme hardness, e. g. over 100 on the Shore durometer, low elongation less than 100%, high tensile strength as high as 3000 pounds per square inch, extreme stability against solvents and chemicals.

As the length of the carbon chain increases, e. g., Examples 3(*d*) to 3(*g*) inclusive, the hardness, tensile strength and resistance to solvents and chemicals decreases, flexibility increases.

Examples 4 and 5 differ from Example 3, in that in the latter the —SH groups are attached to terminal primary carbon atoms whereas in the former the —SH groups are attached to secondary carbon atoms and it is to be noted that the products of Examples 4 and 5 are more elastic than those of 3(*c*) and 3(*b*). The product of Example 6 is similar to that of Example 4.

B. In this class the carbon atoms to which the —SH groups are attached, are joined to and separated by branched chain saturated carbon atoms.

Examples of this class are set forth below:

$$\phantom{HS.CH_2.}CH_3$$
$$\phantom{HS.CH_2.CH}|$$
$$HS.CH_2CH.CH_2SH$$

1,3 dimercapto isobutane $$\phantom{(HS.CH_2O)_2CH_2}CH_3$$
$$\phantom{(HS.CH_2O)_2CH_2C}|$$
$$(HS.CH_2O)_2CH_2CCH_3$$
$$\phantom{(HS.CH_2O)_2CH_2C}|$$
$$\phantom{(HS.CH_2O)_2CH_2C}CH_3$$

1,3 di ($\beta,\beta'$ mercapto methoxy) 2,2 dimethyl propane $$\phantom{HS.CH.}CH_3$$
$$\phantom{HS.C}|$$
$$HS.CH.CH_2SH$$

Propylene dimercaptan

*Example 7.*—Dimercapto isobutane $$SH.CH_2.CH.CH_2.SH$$
$$\phantom{SH.CH_2.C}|$$
$$\phantom{SH.CH_2.}CH_3$$

122 pounds or 1 mol is treated as in Example 1.

The polymer is a soft highly elastic solid. When suitably compounded and cured it displays excellent rubber-like properties. A compound made of 100 parts by weight of this polymer, 10 parts zinc oxide and 60 parts carbon black cured 15 minutes at 140° C. gave a soft rubber-like stock having a tensile strength of 1500 lbs. per square inch and an extensibility of 400% before break.

*Example 8.*—1,3 dimercapto 2 ethyl propane $$SH.CH_2.CH.CH_2.SH$$
$$\phantom{SH.CH_2.C}|$$
$$\phantom{SH.CH_2.}CH_2$$
$$\phantom{SH.CH_2.C}|$$
$$\phantom{SH.CH_2.}CH_3$$

136 pounds are treated as in Example 1.

The characteristics of this polymer are, in the main, similar to those of the polymer described under Example 7. It is somewhat less rubber-like but is tougher and harder.

In general the uncured and cured polymers of this class display greater softness and elasticity than those produced from the corresponding saturated straight chain compounds.

C. Where the carbon atoms to which the —SH groups are attached are joined to and separated by atomic structures characterized by an ether or thio ether linkage.

*Example 9.*—Di mercapto ethoxy ethyl ether $$HS.C_2H_4.O.C_2H_4.OC_2H_4.SH$$

182 pounds or 1 mol is dissolved in an alkaline solution and treated as in Example 1 above.

The product obtained was a greyish white mass. It has highly elastic properties and prior to curing thin strips of the material, submitted to X-ray examination, exhibit a fiber diagram on stretch similar to that given by natural rubber. The product is practically odorless.

*Example 10.*—Di (mercapto methyl) ether $$SH.CH_2.O.CH_2.SH$$

110 pounds or 1 mol is treated as in Example 1 above.

The uncured product is, when dried, a pale amber elastic mass. After curing it is a tough rubber-like solid, highly resistant to the action of most organic solvents and even withstands, to a considerable degree, the action of chlorinated solvents.

*Example 11.*—Di mercapto thio ethyl ether $$SH.C_2H_4.S.C_2H_4.SH$$

154 pounds or 1 mol is treated as in Example 1 above.

The uncured product is, when dried, a pale yellowish tough and somewhat elastic mass. After curing its resistance to water absorption is higher than that of the product produced from the corresponding ether compound.

*Example 12.*—Di mercapto methyl ethyl ether $$SH.CH_2.O.C_2H_4.SH$$

125 pounds or 1 mol is treated as in Example 1 above.

The uncured product is a grayish brown mass, tough, flexible and somewhat elastic. After curing it is unaffected by alcohol, acetone, gasoline and practically unaffected by benzene and carbon tetrachloride.

*Example 13.*—2,2 dimethyl, 1,3 di (mercapto methoxy) propane.

$$\phantom{SH.CH_2O.CH_2.}CH_3$$
$$\phantom{SH.CH_2O.CH_2.C}|$$
$$SH.CH_2O.CH_2.C.CH_2O.CH_2.SH$$
$$\phantom{SH.CH_2O.CH_2.C}|$$
$$\phantom{SH.CH_2O.CH_2.}CH_3$$

196 pounds or 1 mol is treated as in Example 1.

*Example 14.*—Di (mercapto methyl) thio ether $$SH.CH_2.S.CH_2.SH$$

126 pounds or 1 mol is treated as in Example 1.

This product is, in general, quite similar to the product described in Example 12. After curing it is entirely non-permeable to water or dilute salt solutions, even after long exposure.

*Example 15.*—Di (gamma mercapto propyl) formal, $$SH.CH_2.CH_2.CH_2.O.CH_2.O.CH_2.CH_2.CH_2.SH$$

196 pounds of 1 mol is treated as in Example 1.

The product is a tough, soft, elastic, rubbery mass. It is entirely without odor.

*Example 16.*—Di (beta mercapto diethyl) formal,

SH.C₂H₄O.CH₂O.C₂H₄.SH 168 pounds or 1 mol is treated as in Example 1.

This product is quite similar to that described under Example 15.

It is characterized by freedom from odor and very high elasticity.

*Example 17.*—1 mercapto methoxy, 2 methoxy, 2 mercapto ethane.

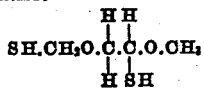

154 pounds are treated as in Example 1.

When dry it is a pale amber odorless polymer, elastic and quite tough.

*Example 18.*—Para di (beta mercapto ethoxy) benzene

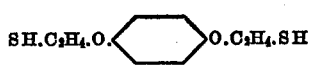

230 pounds are treated as in Example 1.

The polymer is a tough, pliable, somewhat elastic mass. It gradually turns from gray to amber on standing.

When one empirical molecular weight, 228 g. of the polymer, is compounded with 2 gram atoms of sulfur, 64 g., a combination occurs presumably to form a coordinated compound with the sulfur.

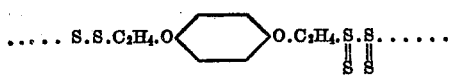

This sulfur cannot be extracted with ordinary sulfur solvents, such as acetone, in the cold. However, when from 5 to 10% of the polymer are compounded into a rubber stock containing no sulfur, a good tight cure of the rubber is obtained and no bloom is encountered, even on long exposure of the rubber stock. This provides a feasible method of rubber cure without free sulfur, and the fact that the cure is surprisingly tight would tend to indicate that the excess sulfur is still combined with the polymer, only such sulfur as can actually be combined with the rubber phase having been given up.

This aryl-oxygen linkage possesses marked negative characteristics and confers increased reactivity upon the SH groups.

*Example 19.*—Di (mercapto methoxy) ethane

SH.CH₂.O.CH₂.CH₂.O.CH₂SH 154 pounds are treated as in Example 1.

The product obtained is a white material capable of being molded under heat and pressure, upon which it becomes tough and elastic.

*Example 20.*—Di (gamma mercapto propyl) sulfide

SH.CH₂.CH₂.CH₂.S.CH₂.CH₂.CH₂.SH 182 grams are treated as in Example 1.

The polymer is a white granular powder capable of being molded under heat and pressure. After forming, the product is tough and elastic. When compounded with two or three gram atoms of sulfur per unit mol of the polymer and heated to 100° C. for from 3 to 4 hours, it becomes a soft, elastic, rubbery mass.

In general, the outstanding characteristic of cured plastics produced from class C compounds, as distinguished from class A and B compounds, is resistance to low temperatures without becoming brittle. There was no way of predicting this unique property and it is wholly unexpected. This property is combined with resistance to solvents comparable to the compounds of class A and elasticity and elongation superior thereto. All of the compounds of class C have an ether or thio ether linkage between the carbon atoms to which the —SH groups are attached and to this structure is attributed the special and outstanding properties of polymers and plastics from class C compounds. One illustration of the utility of this combination of properties is the manufacture of elastic hose as a conduit for solvents at low temperatures, as in cold climates.

Another example of the improvement obtained by using class C compounds over class A is illustrated by the following comparison. The compounds compared were made as set forth in Example 3 (e) and Example 9, respectively, and cured as in Example 2.

|  | Example 3(e) | Example 9 |
|---|---|---|
| Temperature at which material loses flexibility | −10° F. | −45° F. |
| Tensile strength | 1000 lbs./sq. in. | 2000 lbs. sq. in. |
| Elongation at break | 200% | 500% |
| Permanent set or deformation after elongation | 40% | 10% |

In addition to the examples of compounds having an ether linkage set forth above, the following are also submitted.

*Example 21.*—β, β' dimercapto ethyl carbonate

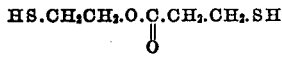

1 mol is treated as in Example 1.

*Example 22.*—Gamma, gamma' dimercapto propyl carbonate

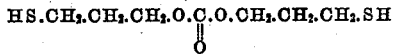

1 mol is treated as in Example 1.

*Example 23.*—Gamma, gamma' dimercapto propyl ether

SH.CH₂.CH₂.CH₂.O.CH₂.CH₂.CH₂.SH 1 mol was treated as in Example 1.

The compounds of Examples 21 and 22 have between the carbon atoms to which the —SH groups are attached, a structure combining the characteristics of an ether, a ketone and an ester.

D. Where the carbon atoms to which the —SH groups are attached are joined to and separated by structures characterized by the presence of unsaturated carbon atoms.

*Example 24.*—1,4 dimercapto, 2,3 butene

HS.CH₂.CH=CH.CH₂.SH 120 pounds are treated as in Example 1.

The polymer is a rubbery spongy mass. When compounded with sulfur and zinc oxide and heated becomes a highly elastic rubbery solid.

*Example 25.*—1 mercapto, 3 mercapto tolyl, 2,3 propene,

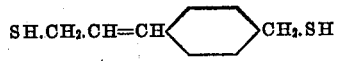

196 pounds were treated as in Example 1.

The properties of this derivative are quite similar to those described under Example 24. The presence of the double bond is more of a determinant of the properties of the polymer than the benzene ring.

The polymers produced as in Examples 24 and 25 are greyish-white masses possessing marked resiliency and other properties similar to those mentioned in describing the properties of the polymers of Examples 9 to 23.

Said marked resiliency is associated with the fact that the carbon atoms to which an —SH group is attached are separated by structures including unsaturated carbon atoms. This structure possesses marked negative properties and confers reactivity upon the —SH groups.

There is a property common to the compounds used in classes C and D. In C the structure separating the carbon atoms to which the —SH groups are attached is characterized by ether or thio ether linkages. These linkages are markedly negative in character and this negative property confers reactivity on the —SH groups and the carbon atoms to which they are attached.

The presence of structures characterized by unsaturated carbon atoms as exemplified above in Examples 24 and 25 confers properties on the polymer made therefrom similar to those possessed by polymers made from the di-substituted ethers and thio ethers; and those properties including the ability to withstand low temperatures without losing flexibility will be found described above.

The polymers of class C and D can all be cured as in Example 2.

E. Where the carbon atoms to which the —SH groups are attached are joined to and separated by an aryl group or groups.

*Example 26.*—Para di mercapto xylene

170 pounds are treated as in Example 1.

The product is a yellowish powder with a faint pleasant aromatic odor. It can be molded with heat and pressure. It combines with sulfur to give a tough elastic solid.

*Example 27*—Para di mercapto benzene

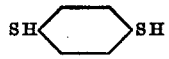

142 pounds are treated as in Example 1.

Pale amber molding powder, tough and somewhat elastic. The derivative of ortho di mercapto benzene made from ortho dichloro benzene is a polymer which differs slightly if at all from the para compound. Both polymers are practically odorless except that the ortho derivative has a very faint mint-like odor. Both combine with considerable amounts of free sulfur which enter into a combination stable at ordinary temperatures, but capable of being given off at vulcanizing temperatures to produce vulcanization of rubber and its analogs.

*Example 28.*—

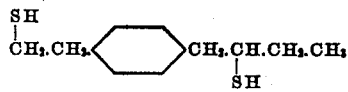

226 pounds are treated as in Example 1.

Polymer is an elastic solid very slightly soluble in benzene but insoluble in alcohol and ether.

The polymers of this group E can all be cured as in Example 2. The uncured polymers of group E have a tendency to be granular, thermoplastic powders in contrast to the elasticity of the polymers made from compounds when the —SH groups are separated by ether or a thio ether linkage and unsaturated carbon atoms (groups C and D). The polymers of group E acquire elasticity upon curing.

In general, the polymers produced can be classified as follows as to properties:

Groups C and D. Elasticity combined with property of retaining this characteristic at low temperatures (after curing).

Group E. Granular condition of uncured polymer. Cured polymer hard with however substantial elasticity.

Groups A and B. These fall between those of E on the one hand and C and D on the other hand.

Thus, where the —SH groups are attached to classes of groups having certain common properties, e. g., (A) saturated straight-chain hydrocarbons, (B) saturated branched hydrocarbons, (C) ether and thio ether linkage, (D) unsaturated carbon atoms, (E) aryl groups, the properties of the resulting polymer are different and those differences have been pointed out.

I can therefore build up compounds having the predominating characteristics of groups A to E respectively. Moreover I can build structures combining the characteristics of these groups or any of them. This I can do by selecting a compound having the following formula:

where R, $R_1$ and $R_2$ represent different classes from the group consisting of ether linkages, aryl groups and saturated hydrocarbons, for example. When such a compound is oxidized as in the present invention, and the resulting polymer cured, it will partake the advantages characteristic of these different classes. This fusion of properties is illustrated in several of the polymers specifically mentioned above.

Another manner in which I can fuse into one polymer the advantageous properties derived from the use of different atomic structure is to select compounds having the formulas

and treat a mixture of these compounds with an oxidizing agent so as to cause the following reaction

R and $R_1$ being members from different classes of compounds. A specific example of this procedure is as follows:

*Example 29.*—2 mols or 276 pounds of dimercapto ethyl ether and 1 mol or 94 pounds of dimercapto ethane $HS.C_2H_4SH$ are treated as in Example 1, except that the caustic soda, magnesium chloride and other reagents are used in the three fold molecular ratio.

I claim:

1. The process which comprises providing an organic compound having an —SH group attached to each of two different carbon atoms, dissolving said compound in an alkaline solution and subjecting said solution to an oxidizing treatment to convert said compound into a polymer and separating said polymer from said solution in a form capable of being cured by a subsequent heat treatment.

2. The process which comprises providing an organic compound having an —SH group attached to each of two terminal carbon atoms, dissolving said compound in an alkaline solution and subjecting said solution to an oxidizing treatment to convert said compound into a polymer and separating said polymer from said solution in a form capable of being cured by a subsequent heat treatment.

3. The process which comprises providing an organic compound having an —SH group attached to each of two different carbon atoms, oxidizing said compound in a dispersion medium and obtaining a polymer in dispersed form, separating the polymer from said medium and from impurities, and obtaining the polymer in intermediate potentially reactive form capable of being cured by a subsequent heat treatment.

4. The process which comprises providing an organic compound having an —SH group attached to each of two terminal carbon atoms, oxidizing said compound in a dispersion medium and obtaining a polymer in dispersed form, separating the polymer from said medium and from impurities, and obtaining the polymer in intermediate, potentially reactive form capable of being cured by a subsequent heat treatment.

5. The process which comprises providing an organic compound having an —SH group attached to each of two different carbon atoms, dissolving said compound in an alkaline solution and subjecting said solution to an oxidizing treatment in the presence of a dispersing agent and thereby converting said compound into a polymer in the form of a latex-like dispersion capable of being washed with water, washing said dispersion to remove impurities, and coagulating the polymer from said washed dispersion in the form of a potentially reactive mass capable of being cured by heat.

6. The process which comprises providing an organic compound having an —SH group attached to each of two different carbon atoms, dissolving said compound in an alkaline solution and subjecting said solution to an oxidizing treatment in the presence of a dispersing agent to convert said compound into a polymer in the form of a latex-like dispersion thereof, acidifying said dispersion and separating said polymer in the form of a potentially reactive mass capable of being cured by heat.

7. The process of producing a polymer capable of producing a synthetic product highly resistant to ordinary solvents, and mechanical and electrical stresses which comprises subjecting an organic compound having an —SH group attached to each of two different carbon atoms to oxidation in a dispersion medium and obtaining a polymer in the form of a dispersion, removing impurities from the dispersion and separating the polymer therefrom as an intermediate potentially reactive mass capable of being compounded with various fillers and oxidizing agents and undergoing a transformation under the influence of heat and said oxidizing agents into a synthetic product having the properties first mentioned above.

8. The process which comprises providing an organic compound having an —SH group attached to each of two different carbon atoms which atoms are joined to and separated by a structure selected from the group consisting of ether and thio ether linkages, oxidizing said compound and converting it into a polymer.

9. The process which comprises providing an organic compound having an —SH group attached to each of two terminal carbon atoms which atoms are joined to and separated by a structure selected from the group consisting of ether and thio ether linkages, oxidizing said compound and converting it into a polymer.

10. The process which comprises providing an organic compound having an —SH group attached to each of two different carbon atoms which carbon atoms are joined to and separated by an ether linkage, oxidizing said compound and converting it into a polymer.

11. The process which comprises providing an organic compound having an —SH group attached to each of two terminal carbon atoms which carbon atoms are joined to and separated by an ether linkage, oxidizing said compound and converting it into a polymer.

12. The process which comprises providing an organic compound having an —SH group attached to each of two different carbon atoms which carbon atoms are joined to and separated by a structure including unsaturated carbon atoms, oxidizing said compound and converting it into a polymer.

13. The process which comprises providing an organic compound having an —SH group attached to each of two terminal carbon atoms which carbon atoms are joined to and separated by a structure including unsaturated carbon atoms, oxidizing said compound and converting it into a polymer.

14. The process which comprises providing an organic compound having an —SH group attached to each of two different carbon atoms which atoms are joined to and separated by a structure including an aryl group, oxidizing said compound and converting it into a polymer.

15. The process which comprises providing an organic compound having an —SH group attached to each of two terminal carbon atoms which atoms are joined to and separated by a structure including an aryl group, oxidizing said compound and converting it into a polymer.

16. The process of producing rubber-like plastics which comprises providing a mercaptan having one —SH group attached to each of the two terminal carbon atoms, dissolving said compound in an alkaline solution, subjecting said solution to an oxidizing treatment in the presence of a dispersing agent to convert said compound into a polymer in the form of a latex-like dispersion thereof, acidifying said dispersion and separating said polymer in the form of a potentially reactive mass capable of being cured by heat.

17. The process of producing rubber-like plastics which comprises providing a mercaptan having one —SH group attached to each of the two terminal carbon atoms, dissolving said compound in an alkaline solution, subjecting said solution to an oxidizing treatment in the presence of a dispersing agent to convert said compound into a polymer in the form of a latex-like dispersion thereof and separating the polymer from said dispersion in the form of a potentially reactive mass capable of being cured by heat.

18. The process of producing rubber-like plastics which comprises providing a mercaptan having one —SH group attached to each of the two terminal carbon atoms, dissolving said compound in an alkaline solution, subjecting said solution to an oxidizing treatment in the presence of a dispersing agent to convert said compound into a polymer in the form of a latex-like dispersion thereof, washing said dispersion to remove impurities therefrom and coagulating the polymer from said dispersion in the form of a potentially reactive mass capable of being cured by heat.

19. The process which comprises providing a mercaptan compound having one —SH group attached to each of the two terminal carbon atoms thereof, which carbon atoms are joined to and separated by a structure selected from the group consisting of ether linkages and thio ether linkages, dissolving said compound in an alkaline solution, subjecting said solution to an oxidizing treatment in the presence of a dispersing agent to convert said compound into a polymer in the form of a latex-like dispersion thereof and separating the polymer from said dispersion in the form of a potentially reactive mass capable of being cured by heat.

20. A rubber-like plastic comprising the reaction product of an oxidizing agent with a mercaptan compound having one —SH group attached to each of the two terminal carbon atoms of said compound, which carbon atoms are joined to and separated by a structure selected from the group consisting of ether linkages and thio ether linkages.

21. A rubber-like plastic comprising the reaction product of an oxidizing agent with a mercaptan compound having one —SH group attached to each of the two terminal carbon atoms of said compound, which carbon atoms are joined to and separated by a structure selected from the group consisting of ether linkages and thio ether linkages, said plastic being capable of being cured by heat.

JOSEPH C. PATRICK.